(12) United States Patent
Hirota et al.

(10) Patent No.: US 10,509,422 B2
(45) Date of Patent: Dec. 17, 2019

(54) MASS FLOW CONTROLLER

(71) Applicant: Hitachi Metals, Ltd., Minato-ku, Tokyo (JP)

(72) Inventors: Tomokazu Hirota, Mie (JP); Hiroyuki Ito, Mie (JP)

(73) Assignee: Hitachi Metals, Ltd., Tokyo (JP)

( * ) Notice: Subject to any disclaimer, the term of this patent is extended or adjusted under 35 U.S.C. 154(b) by 207 days.

(21) Appl. No.: 15/505,944

(22) PCT Filed: Aug. 20, 2015

(86) PCT No.: PCT/JP2015/073323
§ 371 (c)(1),
(2) Date: Feb. 23, 2017

(87) PCT Pub. No.: WO2016/035558
PCT Pub. Date: Mar. 10, 2016

(65) Prior Publication Data
US 2017/0255208 A1 Sep. 7, 2017

(30) Foreign Application Priority Data

Sep. 1, 2014 (JP) .................................. 2014-177063

(51) Int. Cl.
*G05D 7/06* (2006.01)
*G01L 7/08* (2006.01)

(52) U.S. Cl.
CPC ............. *G05D 7/0635* (2013.01); *G01L 7/08* (2013.01)

(58) Field of Classification Search
CPC ..... G05D 7/0635; G05D 16/0669; G01L 7/08
USPC ........................................................ 137/523
See application file for complete search history.

(56) References Cited

U.S. PATENT DOCUMENTS

| 7,740,024 B2* | 6/2010 | Brodeur ................. G01F 1/363 137/12 |
| 2006/0027267 A1* | 2/2006 | Fritze ....................... F17D 5/02 137/487.5 |
| 2015/0212524 A1* | 7/2015 | Kehoe ................. G05D 7/0635 137/15.01 |

FOREIGN PATENT DOCUMENTS

| CN | 101248402 A | 8/2008 |
| JP | 10-207554 A | 8/1998 |
| JP | 2002032130 A | 1/2002 |
| JP | 2003-280745 A | 10/2003 |
| JP | 2004164033 A | 6/2004 |

(Continued)

OTHER PUBLICATIONS

Japanese Patent Office, "International Search Report Regarding International Patent Application No. PCT/2015/073323", dated Oct. 28, 2015, p. 8, Published in: JP.

*Primary Examiner* — P. Macade Nichols
(74) *Attorney, Agent, or Firm* — Neugeboren O'Dowd PC

(57) ABSTRACT

A mass flow controller includes a flow meter, a mechanical pressure-regulating valve disposed adjacent to and on an upstream side of the flow meter, and a flow control valve disposed on a downstream side of the flow meter. The mechanical pressure-regulating valve is embedded in a base of the mass flow controller. The mass flow controller also includes a compulsive valve-opening mechanism configured to compulsorily open the mechanical pressure-regulating valve. Thereby, the mass flow controller can instantly recover pressure on the upstream side of the flow meter to its original pressure even in a case where the pressure changes, and can raise measurement accuracy of a flow rate measured by the flow meter.

21 Claims, 4 Drawing Sheets

(56) References Cited

FOREIGN PATENT DOCUMENTS

JP       2007265395 A    10/2007
JP       2004-157719 A    6/2014

* cited by examiner (A)

(B)

MASS FLOW CONTROLLER

BACKGROUND

Field

This invention is an invention regarding a mass flow controller and, not by way of limitation, this invention relates to a mass flow controller configured to control a mass flow rate based on a measured value of temperature or differential pressure of fluid.

Background

A mass flow rate control device (mass flow controller) is a control device constituted at least by a flow meter configured to measure a flow rate of a fluid, a flow control valve configured to control a flow rate of a fluid, a controlling circuit configured to control these and other parts. The mass flow controller has been widely used for the purpose of, for example, controlling a mass flow rate of a gas supplied into a chamber in a manufacturing process of a semiconductor, etc.

There are various types of flow meters used in mass flow controllers. In a mass flow controller used for the purpose of controlling a mass flow rate of a gas in a manufacturing process of a semiconductor, a thermal type flow meter or a pressure type flow meter has been mainly used. A flow rate of a gas measured by a flow meter is easily affected by influence of pressure of a gas to be measured. For example, in a case where pressure of a gas on an upstream side of a flow meter changes rapidly, etc., it becomes difficult to measure a flow rate correctly. For this reason, mass flow controllers comprising a mechanism for holding constant pressure of a gas on an upstream side of a flow meter for the purpose of measuring and controlling a flow rate correctly have been proposed.

For example, in the Patent Document 1 (Japanese Patent Application Laid-Open (kokai) No. 10-207554), an invention of a flow controller of a fluid characterized by detecting variation in pressure of the fluid on an inlet side where the fluid flows into and controlling, based on the detection result, such that the pressure of the fluid on an upstream side of a flow rate sensor (sensor unit) becomes constant is disclosed. In the Patent Document 1, an example of a configuration of a flow controller in which a pressure control mechanism (pressure control unit) is disposed on an upstream side of a flow rate sensor is described as an embodiment of the invention. This pressure controller monitors and detects change in pressure with a piezo-electric element and adjusts the pressure by varying a path of a pipe.

Moreover, for example, in the Patent Document 2 (Japanese Patent Application Laid-Open (kokai) No. 2003-280745), an invention of a mass flow controller which has a flow control valve and a flow sensor and is characterized by having a pressure control valve which is disposed on an upstream side of the flow control valve, a pressure sensor which is disposed between the pressure control valve and the flow control valve, and a control part which is configured to control the pressure control valve by feeding back an output of the pressure sensor is disclosed. In FIG. 1 of the Patent Document 2, a working example of a mass flow controller which uses a thermal type flow meter is disclosed as an embodiment of the invention.

In FIG. 4 of the Patent Document 2, an example of a semiconductor production line using a conventional mass flow controller is illustrated. In the semiconductor production line illustrated in this figure, a plurality of kinds of gases is supplied to a plurality of lines. In each gas supply line, a gas cylinder, a mechanical pressure regulator, a gauge, a filter and a mass flow controller are connected by a piping in this order from an upstream side toward a downstream side. The mechanical pressure regulator is prepared in order to supply a stable flow rate of a gas.

Furthermore, for example, in the Patent Document 3 (Japanese Patent Application Laid-Open (kokai) No. 2004-157719), an invention of a mass flow controller comprising a flow control valve, a flow rate detection means, a flow control valve disposed on an upstream side of the flow control valve, a pressure detection means disposed between the pressure control valve and the flow control valve, wherein the flow rate detection means is configured to detect differential pressure in a fluid which flows through the inside of a flow passage is disclosed. In FIG. 1 of the Patent Document 3, a configuration in which the thermal type mass flow meter of the mass flow controller disclosed in the Patent Document 2 is replaced with a pressure type mass flow meter is described as an embodiment of the invention.

SUMMARY

Aspects have been conceived in view of the above-mentioned problems which conventional mass flow controllers have, and one of its objectives is to provide a mass flow controller which can instantly recover pressure P1 on an upstream side of a flow meter to its original pressure and thereby raise measurement accuracy of a flow rate measured by the flow meter even in a case where the pressure P1 has varied.

According to an aspect, a mass flow controller comprises a flow meter, a mechanical pressure-regulating valve disposed adjacent to and on an upstream side of the flow meter, and a flow control valve disposed on a downstream side of the flow meter.

In this configuration, a flow rate of a fluid is actively controlled by changing an opening of the flow control valve using a flow rate measured by the flow meter as a controlled variable. On the other hand, pressure of the fluid inside the flow meter is passively controlled by the mechanical pressure-regulating valve disposed on the upstream side. Therefore, two types of active control do not interfere mutually like the conventional technologies.

Moreover, since a mechanical pressure-regulating valve is disposed adjacent to the flow meter and on the upstream side of the flow meter, a result of pressure regulation by the mechanical pressure-regulating valve is instantly reflected in pressure inside the flow meter. Therefore, when the pressure inside the flow meter varied, a time period required for the pressure to return to its original pressure is shorter as compared with the conventional technologies.

According to another aspect, the mechanical pressure-regulating valve is embedded in a base of the mass flow controller. Since the mechanical pressure-regulating valve can be disposed closer to the flow meter which is also embedded in the base, this configuration is preferable in some implementations. Moreover, since larger space can be left on an upper surface of the base by embedding the mechanical pressure-regulating valve in the base as compared with a case where the mechanical pressure-regulating valve is disposed on the upper surface of the base, other members can be installed there or miniaturization of the whole mass flow controller can be attained.

Since a plurality of types of active control does not interfere mutually and the result of the pressure regulation by the mechanical pressure-regulating valve is instantly reflected in the pressure inside the flow meter, the mass flow controller according to some implementations can control the pressure inside the flow meter quickly and stably. Since the pressure of the fluid, which is measured by the flow meter, can always be held constant thereby, measurement accuracy of the flow meter can be raised and, furthermore, accuracy of flow control by the mass flow controller can be improved.

By the way, for example, in cases as listed below, an operation of a mass flow controller is stopped, while a fluid is enclosed in the interior of the mass flow controller.
(1) When the operation of the mass flow controller is stopped by an operator's operation.
(2) When supply power to the mass flow controller is intercepted by an accident, such as a service interruption.
(3) When voltage applied to a flow control valve becomes 0 (zero) by a failure of a power circuit during an operation of a mass flow controller, etc. (in a case of a common normally-closed type flow control valve).
(4) When an opening operation of a flow control valve becomes impossible by a breakage of a piezo-electric element during an operation of a mass flow controller, etc. (when it is a common normally-closed type flow control valve).

Among the above, in the cases of (1) and (2), it is possible to resume the operation of the mass flow controller by an operator's operation and a release from an accident, respectively. However, in the cases of (3) and (4), it is impossible to resume the operation of the mass flow controller, unless the failures of the power and the piezo-electric element circuit are fixed, respectively, or the mass flow controller is replaced. Namely, in these cases, it is necessary to detach the mass flow controller from a supply line of a gas, etc., for example.

On the other hand, for example, in a gas supply line of semiconductor production equipment, etc., hazardous gases, such as a corrosive gas, may be used as a process gas. When a mass flow controller is detached for overhauling while such a hazardous gas is enclosed in its interior, there is a possibility that the hazardous gas may leak out in association with disassembly of the mass flow controller. For this reason, at a location without any preparation to a hazardous gas, a mass flow controller cannot be overhauled.

Then, it has been known to dispose a branched piping for making a gas enclosed in the interior of a mass flow controller discharge safely in a channel of the gas on an upstream side or a downstream side of the mass flow controller in order to prepare for a case as mentioned above. Generally, the gas can be discharged from the interior of the mass flow controller through such a branched piping, for example, using a vacuum pump, etc, before the mass flow controller is detached.

However, the mass flow controller according to an aspect comprises a mechanical pressure-regulating valve as mentioned above. As will be mentioned in detail later, the mechanical pressure-regulating valve is configured to be opened by an aperture appearing between a valve element and a valve seat when pressure in a pressure-regulating chamber is lower than a predetermined set pressure, and to be closed by the aperture disappearing between the valve element and the valve seat when the pressure in the pressure-regulating chamber is higher than the set pressure. Therefore, in a case where the pressure in the pressure-regulating chamber is higher than the set pressure when an operation of the mass flow controller stops for a cause, such as an abnormality occurring in the mass flow controller as mentioned above, the mechanical pressure-regulating valve has been closed.

In the above-mentioned case, a part of a channel of a fluid divided by the mechanical pressure-regulating valve and the flow control valve (which may be hereinafter referred to as a "blockade space") is formed, and a fluid is enclosed in this blockade space. The volume of the blockade space is 0.5 cm 3 or more and 1.0 cm 3 or less, typically.

In such a state as mentioned above, even if the branched piping on the upstream side or the downstream side is decompressed through the branched piping using a vacuum pump, etc., as mentioned above, the fluid enclosed in the interior of the mass flow controller cannot be discharged.

Then, the mass flow controller according to another aspect further comprises a compulsive valve-opening mechanism configured to compulsorily open said mechanical pressure-regulating valve. In accordance with this, a fluid can be discharged from the interior of the mass flow controller before detaching the mass flow controller, for example, by decompressing the branched piping on the upstream side or on the downstream side through the branched piping using a vacuum pump etc., as mentioned above, in a state that the mechanical pressure-regulating valve is compulsorily opened by the compulsive valve-opening mechanism.

As a specific example of the mechanical pressure-regulating valve, a mechanical pressure-regulating valve comprising a pressure-regulating chamber which constitutes a part of a channel of a fluid in said mass flow controller and a diaphragm which separates an internal region of said pressure-regulating chamber from an external region of said channel, and being configured so as to be opened by at least one part of said diaphragm being displaced to a side of said pressure-regulating chamber when pressure of said fluid in said pressure-regulating chamber is lower than a predetermined set pressure.

When the mass flow controller comprises a mechanical pressure-regulating valve having the above-mentioned configuration, said compulsive valve-opening mechanism comprises a member configured to displace at least said one part of said diaphragm to said side of said pressure-regulating chamber by an external operation. In accordance with this, at least one part of the diaphragm can be mechanically displaced to the pressure-regulating chamber side by the member, the mechanical pressure-regulating valve can be compulsorily opened, and the fluid can be discharged from the interior of the mass flow controller.

According to another aspect, said compulsive valve-opening mechanism is disposed in an outer region of the channel of the fluid. In accordance with this, a seal structure for maintaining airtightness of the channel of the fluid, etc. can be omitted, and the compulsive valve-opening mechanism can be constituted as a simpler configuration.

In addition, yet another aspect includes an opening when the mechanical pressure-regulating valve is compulsorily opened by the above-mentioned compulsive valve-opening mechanism is larger than a maximum opening of the mechanical pressure-regulating valve at the time of a (normal) operation of the mass flow controller. In accordance with this, discharge efficiency when the mechanical pressure-regulating valve is compulsorily opened to make the fluid discharge from the interior of the mass flow controller can be enhanced to shorten a time period required for discharging, or ultimate vacuum in exhaustion by a vacuum pump can be raised.

DETAILED DESCRIPTION

Embodiments for carrying out the present invention will be explained below in detail referring to drawings. However, the embodiments explained below are just exemplifications of embodiments of the present invention, embodiments of the present invention are not limited to the embodiments explained below.

All the inventions disclosed in the above-mentioned Patent Documents 1 to 3 contribute to improvement in measurement accuracy of a flow rate in that they can keep constant pressure of a gas on an upstream side of a flow meter by preparing a pressure detection means (pressure sensor) and a pressure control means (pressure control valve, etc.) on the upstream side of the flow meter.

However, all the pressure control means in the conventional technologies perform what is called "active control" in which pressure detected by a pressure detection means is used as a "controlled variable." Therefore, two types of active control, i.e., active control in which pressure is used as a controlled variable and active control in which a flow rate detected by a flow meter is used as a controlled variable, come to be simultaneously performed in one mass flow controller, and a plurality of types of active control cannot be avoided from affecting mutually (or interfering). For this reason, when variation in pressure of a gas on an upstream side of a flow meter arises for a certain cause, there is a problem that it takes a long time for the pressure to recover to its original pressure.

As an example of the above-mentioned problem, a case where a pressure type flow meter is used as a flow meter will be explained more specifically. A measurement of a flow rate by a pressure type flow meter is performed using a fact that a flow rate is proportional to differential pressure $\Delta P$ between pressure on an upstream side of a pressure type flow meter (which will be hereinafter referred to as "P1") and pressure on a downstream side of the pressure type flow meter (which will be hereinafter referred to as "P2"), etc., for example. In a case where the differential pressure $\Delta P$ which is proportional to a flow rate is to be brought closer to a target value by actively controlling an opening of a flow control valve, P1 is influenced by change in P2 to be changed, when a function of a pressure control means to control P1 to a fixed value is insufficient or delay in the control occurs.

In such a case, even though the differential pressure $\Delta P$ can be controlled to the target value, the flow rate deviates from the target value by the change in the pressure P1 before and after the control. In order to correct this deviation, for example, a countermeasure, such as previously measuring relation between the differential pressure $\Delta P$ and a flow rate for every different value of P1 as for a kind of gas to be used, becomes necessary, and huge time and man-hour are required for obtaining such data.

Figure 4:
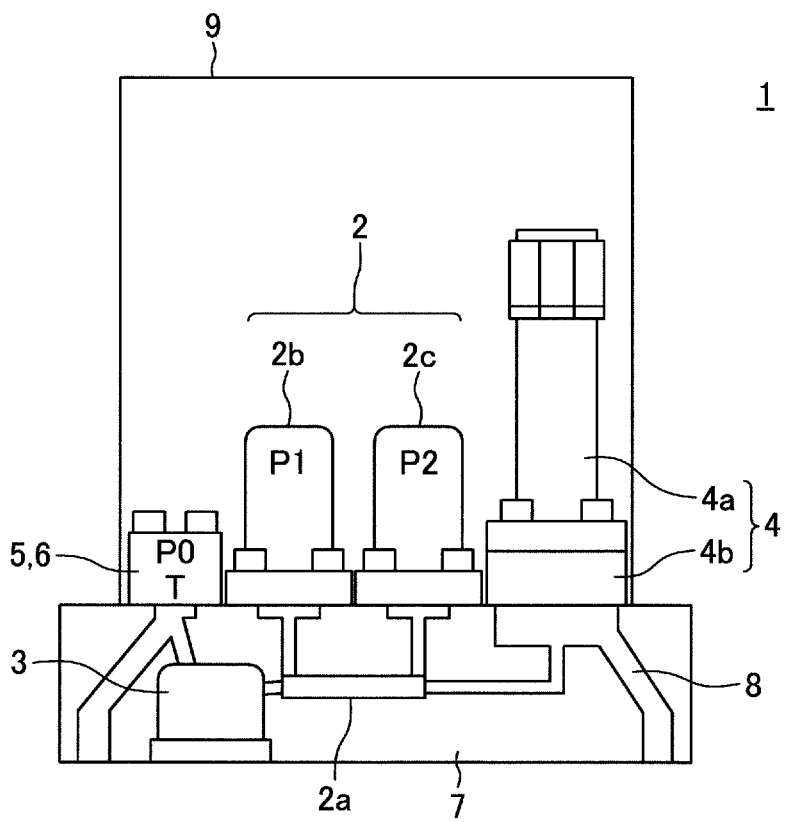
FIG. 4 is a side view for showing an example of an implementation of a mass flow controller according to the present invention.

On the other hand, for the purpose of keeping constant pressure of a gas whose flow rate is to be measured, it is possible to prepare a mechanical pressure regulator between a gas cylinder and a mass flow controller, as illustrated in FIG. 4 of the Patent Document 2, for example. The mechanical pressure regulator performs what is called a "passive control" in which pressure on a downstream side is hold to a predetermined value. For this reason, in accordance with the above-mentioned configuration, it seems that pressure of the gas inside the mass flow controller can be recovered quickly to its original pressure.

However, in the conventional semiconductor production line illustrated in FIG. 4 of the Patent Document 2, a gauge, a filter and a piping, etc. exist between the mechanical pressure regulator and the flow meter inside the mass flow controller. Fluid resistances of these members and piping and volume of the gas flowing through them are too large to be disregarded when performing pressure control. For this reason, even though the pressure of the gas is adjusted by the mechanical pressure regulator, it cannot be avoided to take a long time for the pressure of the gas at a position of the flow meter to reach that adjusted pressure.

Aspects disclosed herein have been conceived in view of the above-mentioned problems which conventional mass flow controllers have, and one of its objectives is to provide a mass flow controller which can instantly recover pressure P1 on an upstream side of a flow meter to its original pressure and thereby raise measurement accuracy of a flow rate measured by the flow meter even in a case where the pressure P1 has varied.

Figure 1:
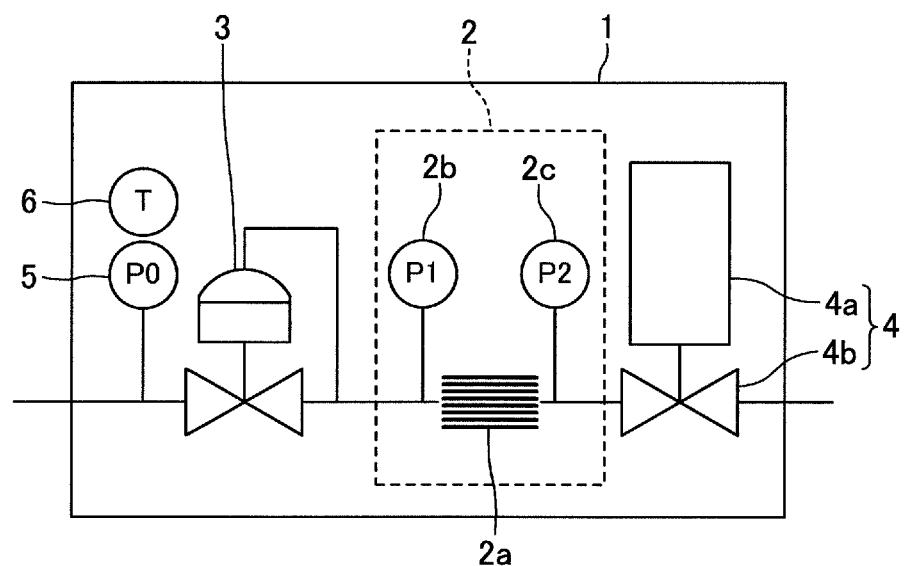
FIG. 1 is a schematic view for showing an example of a configuration of a mass flow controller according to the present invention.

FIG. 1 is a schematic view for showing an example of a configuration of a mass flow controller according to the present invention. A fluid (liquid or gas) flows into the mass flow controller 1 from a left-hand side, and flows out of a right-hand side of the drawing. The mass flow controller 1 according to the present invention comprises a flow meter 2, a mechanical pressure-regulating valve 3, and a flow control valve 4. The mechanical pressure-regulating valve 3 is disposed adjacent to and on an upstream side of the flow meter 2. The flow control valve 4 is disposed on a downstream side of the flow meter 2. The flow control valve 4 comprises a valve 4b and a piezo-electric element 4a for opening and closing the valve 4b.

As the flow meter 2, a well-known flow meter which has a function to measure a flow rate of a fluid can be used. As mentioned above, in a mass flow controller used for the purpose of controlling a mass flow rate of a gas in a manufacturing process of a semiconductor, a thermal type flow meter or a pressure type flow meter has been mainly used. In a thermal type flow meter, a sensor wire is prepared respectively on an upstream side and a downstream side of a sensor tube branched from a channel to heats a fluid indirectly, and a flow rate is measured using a temperature difference between the sensor wires, which is generated in association with a migration of heat by flow of a fluid.

In a pressure type flow meter, fluid resistance, such as a nozzle, an orifice, and a laminar flow element, is prepared in the middle of a channel, and a flow rate is measured using a fact that a flow rate is proportional to differential pressure AP between pressure P1 on an upstream side and pressure P2 on a downstream side of the fluid resistance, etc., for example. In a pressure type flow meter, pressure may be measured using a separate pressure measuring means for each of P1 and P2, and may be measured using a differential pressure measuring means which can measure differential pressure between P1 and P2. A well-known pressure sensor or differential pressure sensor can be used for measuring pressure or differential pressure.

The flow meter 2 exemplified in FIG. 1 comprises a laminar flow element 2a as fluid resistance, and it is configured such that the pressure P1 on an upstream side of the laminar flow element 2a and the pressure P2 on a downstream side are measured by respectively separate pressure sensors 2b and 2c. Since a flow rate measured by a pressure type flow meter is a volumetric flow rate, this can be converted into a mass flow rate using an average value of the P1 and P2, etc., for example. When the AP is measured using one differential pressure sensor instead of the pressure sensors 2b and 2c, a pressure sensor aside from the differential pressure sensor can be prepared, pressure of a fluid at a position of the pressure type flow meter can be measured, and a volumetric flow rate can be converted into a mass flow rate using this pressure.

In the mass flow controller according to the present invention, various types of well-known flow meter can be used as a flow meter. However, among them, especially in a pressure type flow meter, variation in pressure on an upstream side directly affects accuracy of metering of a flow rate. Therefore, effectiveness of pressure regulation by the present invention is maximized is a case where a pressure type flow meter is used as a flow meter. However, since variation in pressure on the upstream side affects the accuracy of metering also in flow meters other than a pressure type flow meter (for example, thermal type flow meter, etc.) although it is not comparable to that in a case of a pressure type flow meter, the effectiveness of the present invention is not limited to a case where a pressure type flow meter is used.

As a factor for which pressure on an upstream side of a flow meter changes, change in pressure of a gas in a gas supply line which supplies the gas to a mass flow controller (which will be hereinafter referred to as "P0"), etc. can be enumerated, for example. In the mass flow controller 1 shown in FIG. 1, a pressure sensor 5 is disposed on an upstream side of the mechanical pressure-regulating valve for the purpose of monitoring the variation in the P0. Moreover, a thermal sensor 6 which measures temperature T of the gas supplied to the mass flow controller is also disposed at the same position.

The mechanical pressure-regulating valve 3 is a pressure-regulating valve (pressure regulator) which can adjust pressure only by a mechanical operation without using an electric means. The mechanical pressure-regulating valve 3 has an action to always maintain the pressure on the downstream side (P1) at a predetermined constant value even when the pressure on the upstream side of the mechanical pressure-regulating valve 3 (P0) and the pressure on the downstream side of the mechanical pressure-regulating valve 3 (P1) have changed within a supposed range. For this reason, even in a case where the pressure P0 of the gas of the gas supply line has varied, or the pressure P2 on the downstream side of the flow meter has varied in association with flow control by the action of the mass flow controller, the P1 can be prevented from varying under the influence the variation of the P0 or P2.

Example 1

Figure 2:
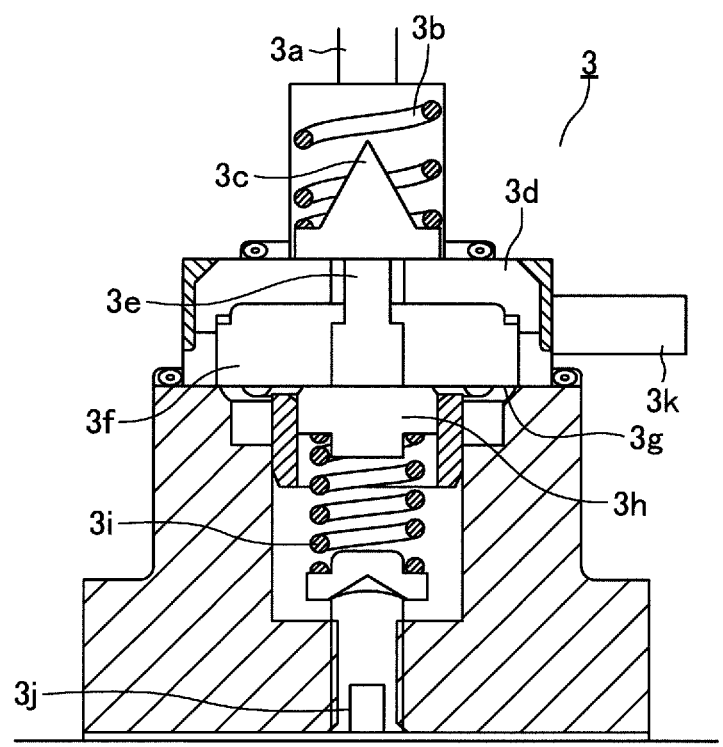
FIG. 2 is a sectional view for showing a working example of a mechanical pressure-regulating valve according to the present invention.

A pressure-regulating action by the mechanical pressure-regulating valve 3 will be explained in more detail referring to FIG. 2. FIG. 2 is a sectional view for showing a working example of the mechanical pressure-regulating valve according to the present invention. The gas supplied to the mass flow controller 1 from the gas supply line flows into the interior of the mechanical pressure-regulating valve 3 from a fluid inlet 3a. The gas goes through an aperture between a valve element 3c and of a valve seat 3d into a pressure-regulating chamber 3f, and thereafter flows out of a fluid outlet 3k toward the flow meter 2.

The valve element 3c is depressed in a direction toward the valve seat 3d by elastic power of a valve spring 3b. Size of the aperture between the valve element 3c and the valve seat 3d is adjusted by up-and-down (vertical) movement of a stem 3e which is pushing up the valve element 3c from the bottom. A bottom of the stem 3e is laid on an upper surface of a diaphragm 3g. A diaphragm retainer 3h is disposed on an undersurface of the diaphragm 3g, a bottom of the diaphragm retainer 3h is supported by a pressure-regulating spring 3i. A position of the pressure-regulating spring 3i can be adjusted by an adjusting screw 3j in an up-and-down direction.

When the pressure P1 of the pressure-regulating chamber 3f is lower than set pressure PS, since force with which a fluid depresses the diaphragm 3g is weak, the diaphragm retainer 3h, the stem 3e and the valve element 3c are pushed upward against elastic force of the valve spring 3b and the pressure P0, by elastic force of the regulation spring 3i. As a result, since an aperture is made between the valve element 3c and the valve seat 3d, the fluid enters from the fluid inlet 3a, and flows out of the fluid outlet 3k through the pressure-regulating chamber 3f.

Since force with which the fluid depresses the diaphragm 3g acts in addition to the elastic force of the valve spring 3b and the pressure P0 when the pressure P1 of the pressure-regulating chamber 3f is higher than the set pressure PS, the diaphragm retainer 3h, the stem 3e and the valve element 3c are displaced downward against the elastic force of the regulation spring 3i. As a result, since the aperture between the valve element 3c and the valve seat 3d disappears, flow of the fluid is intercepted.

Thus, the mechanical pressure-regulating valve 3 acts such that the fluid flows when the pressure P1 in the pressure-regulating chamber 3f, which the diaphragm 3g receives, is lower than the set pressure PS while the fluid does not flow when the pressure P1 is higher than the set pressure PS. As a result, the P1 is adjusted until it becomes equal to the set pressure PS. In addition, the set pressure PS can be changed according to the position of the adjusting screw 3j. When the adjusting screw 3j is screwed in using a driver, etc., since the elastic force of the pressure-regulating spring 3i increases, the set pressure PS shifts to a high-pressure side. On the contrary, when the adjusting screw 3j is loosened, the set pressure PS shifts to a low-pressure side.

A pressure-regulating action of the pressure P1 by the above-mentioned mechanical pressure-regulating valve 3 is directly brought about by the up-and-down movement of the stem 3e interlocked with the up-and-down movement of the diaphragm 3g. Therefore, when the P1 varies to become a value different from the set pressure PS, a regulation action acts promptly, and the P1 is immediately adjusted until it becomes equal to the PS. Since this regulation action is carried out based on a difference between the pressure P1 in the pressure-regulating chamber 3f and the set pressure PS, it acts quickly whether the cause of the variation of the P1 is a variation of P0 or a variation of the P2.

It can be said that the pressure-regulating action by the mechanical pressure-regulating valve in the mass flow controller according to the present invention is a passive control. Here, "passive" means "being in a position to receive an operation from other. Inactiveness" (cited from Shin-Meikai Kokugo-Jiten (Japanese dictionary)). In the mechanical pressure-regulating valve 3 according to the present invention, the diaphragm 3g is in a position to receive variation in the pressure P1 in the pressure-regulating chamber 3f And a displacement of a means to detect the variation in the pressure P1 (diaphragm 3g) is used for adjusting the aperture between the valve element 3c and the valve seat 3d as it is. Therefore, it can be said that the pressure-regulating action by the mechanical pressure-regulating valve is a passive control as a whole.

On the other hand, it can be said that a pressure control means according to a conventional technology uses active control. Here, "active" means "to act on others positively" (cited from Shin-Meikai Kokugo-Jiten (Japanese dictionary)). In the conventional technology, the pressure control means (pressure control valve) is operated positively such that the pressure P1 detected by the pressure detection means (pressure sensor) becomes equal to the set pressure PS. Here, the pressure detection means and the pressure control means are constituted independently of each other as members which bring about completely separate functions. Therefore, it can be said that the pressure control means according to the conventional technology uses active control as a whole.

Between active control and passive control, response speed to variation in the pressure P1 is different. Namely, in passive control like the mechanical pressure-regulating valve according to the present invention, since the pressure detection means and the pressure control means are constituted inseparably, variation in the pressure P1 is reflected in an operation of the pressure control means (mechanical pressure-regulating valve) without any pause. On the other hand, in active control like the pressure control means according to the conventional technology, the pressure detection means and the pressure control means are constituted independently of each other, and their positions in the channel of a fluid are also different from each other. In addition, based on the pressure detected by the pressure detection means, the pressure control means is operated. As a result, before the result of the pressure control by the pressure control means is reflected in the output of the pressure detection means, a time lag will arise.

Moreover, between the passive control and active control, degrees of influence (interference) affected from other active control are differ from each other. Namely, in passive control like the mechanical pressure-regulating valve according to the present invention, even when pressure of a fluid is varied as a result of the active control by the flow control valve, the varied pressure is immediately restored to its original pressure by action of the mechanical pressure-regulating valve.

On the other hand, in active control like the pressure control means according to the conventional technology, when the pressure of the fluid is varied as a result of the active control of the mass flow rate by the flow control valve, in order to cancel the pressure variation, the pressure control means which performs another active control acts to restore the pressure to its original pressure. However, in active control, a longer time period is needed for pressure regulation as compared with passive control. Therefore, in order to adjust variation in a flow rate brought about by the variation in the pressure during that time period, the active control by the flow control valve acts again. Thus, since two types of active control influences each other (interference), a time period required for stabilizing the pressure and flow rate finally becomes longer.

In the present invention, the mechanical pressure-regulating valve 3 is disposed adjacent to and on the upstream side of the flow meter 2. Here, "adjacent" means that no other components exist between the mechanical pressure-regulating valve 3 and the flow meter 2 and both of them are directly joined with each other by a piping member. It is preferable that the piping member which joins the mechanical pressure-regulating valve 3 and the flow meter 2 is short as possible.

Since the fluid resistance between the mechanical pressure-regulating valve 3 and the flow meter 2 and the volume of the fluid therein become smaller by disposing the mechanical pressure-regulating valve 3 on the upstream side of the flow meter 2, the result of having adjusted the pressure of in the pressure-regulating chamber 3f of the mechanical pressure-regulating valve 3 such that it becomes equal to the set pressure PS is immediately reflected in the pressure inside the flow meter 2. Thereby, since the pressure inside the flow meter 2 is maintained such that it is always equal to the set pressure PS, the measurement accuracy of a flow rate by the flow meter 2 is raised. Moreover, it becomes unnecessary to prepare a vast quantity of data for flow rates supposing variation in the pressure P1 on the upstream side of the flow meter.

In the mechanical pressure-regulating valve 3, the undersurface of the diaphragm 3g is communicated with open air in an environment where the mass flow controller 1 is installed. Therefore, when atmospheric pressure when the set pressure PS was adjusted using the adjusting screw 3j is different from atmospheric pressure when actually using the mass flow controller 1, the pressure P1 in the pressure-regulating chamber 3f adjusted with the mechanical pressure-regulating valve 3 comes to shift from the set pressure PS. In order to prevent that, for example, when elevation of a location where the mass flow controller 1 is used is known beforehand, a countermeasure, such as adjustment of the set pressure PS taking into consideration a difference of elevation from a production site.

For example, in a case of a mechanical pressure-regulating valve having a structure shown in FIG. 2, as a working example of a pressure regulation function by a mechanical pressure-regulating valve, when the set pressure PS is set to 0.05 MPa (50 kPa) and the pressure P0 in the gas supply line is fluctuated between 0.10 MPa and 0.30 MPa, the variation in the pressure P1 by on the downstream side of the mechanical pressure-regulating valve was within a range of 50±5 kPa. When the pressure variation on the upstream side of a pressure type flow meter is also within this range, there is no problem in measurement accuracy of a flow rate.

Example 2

Figure 3:
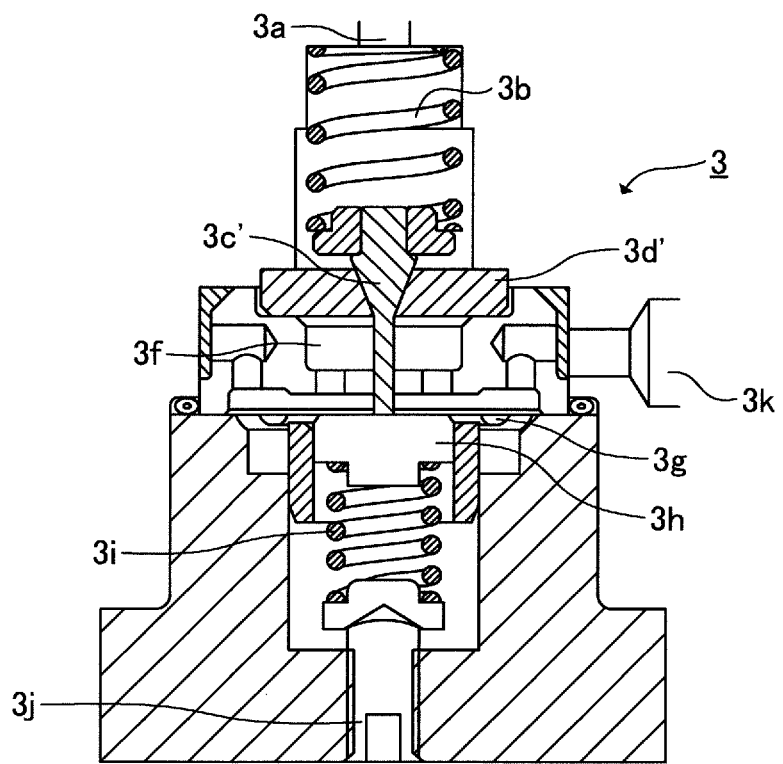
FIG. 3 is a sectional view for showing another working example of a mechanical pressure-regulating valve according to the present invention.

FIG. 3 is a sectional view for showing another working example of the mechanical pressure-regulating valve according to the present invention. In the present working example shown here, a fundamental structure of the mechanical pressure-regulating valve is the same as the working example exemplified in FIG. 2. A greatly different point is in that the structure in which the valve element 3c and the stem 3e are separated from each other as shown in the working example of FIG. 2 is replaced with a valve element 3c' united with the stem. This valve element 3c' is configured such that its lower part has a long and thin rod-like shape and its apex (lower end) touches the upper surface of the diaphragm 3g. In accordance with this configuration, since the movement of the diaphragm 3g in an up-and-down direction is transmitted directly to the valve element 3c', quicker pressure regulation becomes possible.

Moreover, a contact surface between the valve element 3c' and a valve seats 3d' in FIG. 3 is constituted by a part of a conical shape instead of a plane. Furthermore, by making small a diameter of the pressure-regulating chamber 3f on the side further from the diaphragm 3g, the volume of the pressure-regulating chamber 3f is made smaller than that in the case of FIG. 2. In accordance with these configurations, switching operation of the mechanical pressure-regulating valve 3 becomes smoother since fluid resistance when a fluid flows into the pressure-regulating chamber 3f from the fluid inlet 3a is reduced, while the result of the pressure regulation by the mechanical pressure-regulating valve is early reflected in the pressure of the flow meter 2 since the volume of the fluid on the downstream side of the valve element becomes smaller.

In the mechanical pressure-regulating valve, when an object is caught in the aperture between the valve element 3c and the valve seat 3d, it becomes impossible for the valve to close completely and its pressure regulation function is spoiled, and therefore it becomes a problem. In order to prevent it, for example, it is preferable to prepare a filter for removing the object on the upstream side (and the downstream side, if needed) of the mechanical pressure-regulating valve, etc. As the filter, well-known filters, such as a mesh type filter and a porous sintered metallic filter, can be used.

Example 3

FIG. 4 is a side view for showing an example of an implementation of a mass flow controller according to the present invention. In this implementation example, a channel 8 is formed inside a base 7 of the mass flow controller 1, and the pressure sensors 2b and 2c, the flow control valve 4, and the pressure sensor 5 and thermal sensor 6 of the flow meter 2 are mounted on the upper surface of the base 7. Moreover, the laminar flow element 2a, which is a component of the flow meter 2, and the mechanical pressure-regulating valve 3 are embedded within the base 7, respectively. The components mounted on the upper surface of the base 7 are covered by a casing 9.

Since a space for mounting the mechanical pressure-regulating valve 3 on the upper surface of the base 7 becomes unnecessary by embedding the whole mechanical pressure-regulating valve 3 inside the base 7 like this implementation example, the size of the whole mass flow controller 1 can be made compacter (smaller). Moreover, other components (parts) (for example, a pressure sensor 5 and thermal sensor 6 in FIG. 4, etc.) can be implemented in a space which became unnecessary, without changing the size of the whole mass flow controller 1.

Example 4

Figure 5:
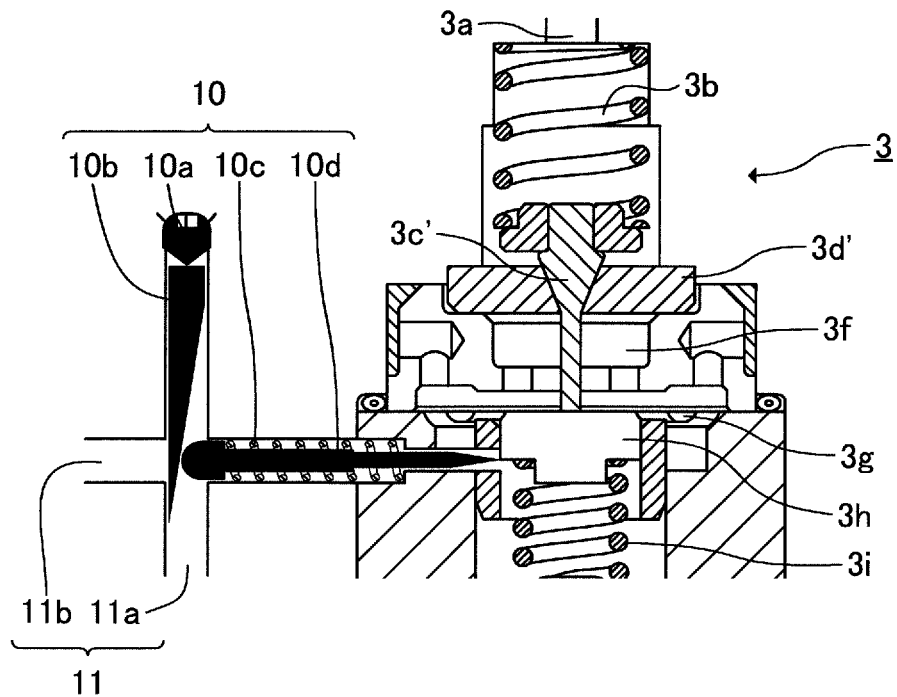
FIG. 5 is a sectional view for showing a mechanical pressure-regulating valve and a compulsive valve-opening mechanism which a mass flow controller according to another working example of the present invention comprises.

FIG. 5 is a sectional view for showing a mechanical pressure-regulating valve and a compulsive valve-opening mechanism which a mass flow controller according to another working example of the present invention comprises. A fundamental structure of the mechanical pressure-regulating valve shown here is the same as that of the working example exemplified in FIG. 3. A greatly different point is in that the mass flow controller 1 shown here further comprises a compulsive valve-opening mechanism 10 for compulsorily opening the mechanical pressure-regulating valve 3.

In this example, the compulsive valve-opening mechanism 10 is constituted by a setscrew 10a, a wedge 10b, a pin spring 10c and a pin 10d, and these members are accommodated in a compulsive valve-opening-mechanism accommodating hole 11 consisting of a wedge accommodating hole 11a and a pin accommodating hole 11b. The pin 10d is energized (pressed) toward a side direction (laterally) by elastic power of the pin spring 10c and therefore does not interfere with the movement of the diaphragm 3g, etc., as shown in FIG. 5, at the time of a normal operation of the mass flow controller 1.

Figure 6:
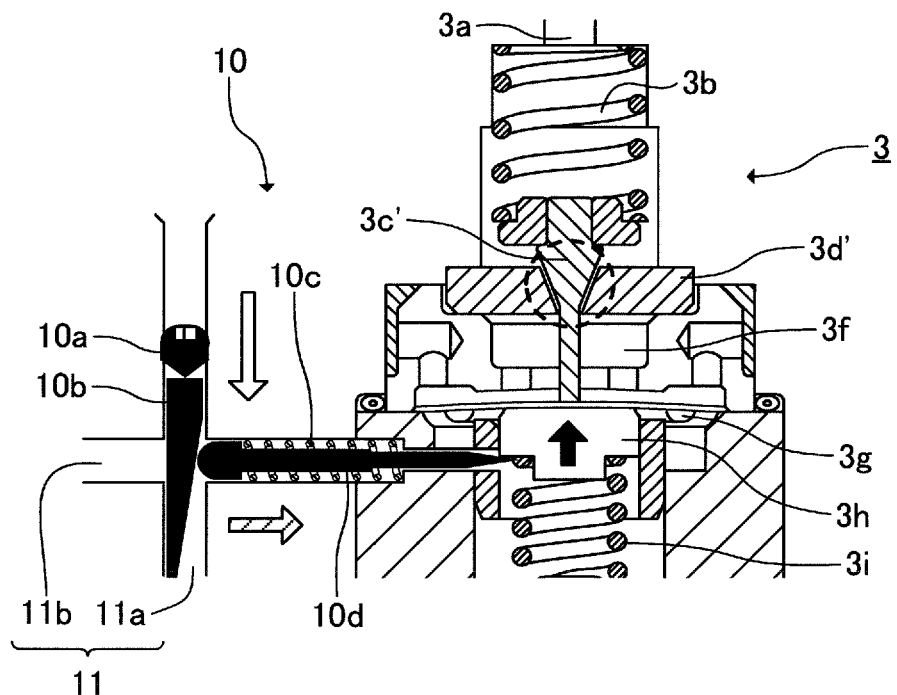
FIG. 6 is a sectional view for showing a manner in which the mechanical pressure-regulating valve shown in FIG. 5 is opened by the compulsive valve-opening mechanism.

The setscrew 10a is fitted into a screw groove formed in an inner wall of the wedge accommodating hole 11a. When compulsorily opening the mechanical pressure-regulating valve 3, the setscrew 10a is screwed into the accommodating hole 11a and thereby displaced from an upper side to a lower side (downward) by being while contacting an upper-end part of the wedge 10b. Thereby, the wedge 10b is displaced from an upper side to a lower side (downward), while contacting a side end of the pin 10d, as expressed by an outlined white arrow shown in FIG. 6.

When the wedge 10b is displaced from the upper side to the lower side as mentioned above, the pin 10d is displaced toward an axis direction of the pressure-regulating spring 3i from the side while contacting a bottom surface of the diaphragm retainer 3f, as expressed by a shaded arrow. As a result, the pin 10d pushes up the diaphragm retainer 3f upward, as expressed by a black arrow.

The diaphragm retainer 3f pushed up as mentioned above pushes up the diaphragm 3g, and the diaphragm 3g pushes up the valve element 3c'. As a result, as expressed by a circle illustrated by a broken line in FIG. 6, an aperture is produced between the valve element 3c' and the valve seat 3d'. Namely, the mechanical pressure-regulating valve 3 is opened compulsorily.

As mentioned above, in accordance with the mass flow controller 1 shown here, the mechanical pressure-regulating valve 3 can be opened compulsorily by the compulsive valve-opening mechanism 10. Therefore, even in a case where a fluid is enclosed in a part of the channel 8 of the fluid divided by the mechanical pressure-regulating valve 3 and the flow control valve 4 (blockade space) when an operation of the mass flow controller 1 stops, as mentioned above, the fluid can be discharged from the blockade space before detaching the mass flow controller 1, for example, from a gas supply line of semiconductor production equipment, etc., by decompressing the interior of the branched piping (not shown) on an upstream side of the mechanical pressure-regulating valve 3 using a vacuum pump, etc. In addition, the volume of the blockade space in the mass flow controller 1 shown here is 0.7 cm 3.

Material of the setscrew 10a, the wedge 10b, the pin spring 10c and the pin 10d which constitute the compulsive valve-opening mechanism 10 is not particularly limited as long as it has strength, hardness, abrasion resistance, etc. which can compulsorily open the mechanical pressure-regulating valve 3 as mentioned above. In addition, as the material of the wedge 10b and the pin 10d in the mass flow controller 1 shown here, polyacetal is adopted.

Moreover, in the mass flow controller 1 shown above, no mechanism which energizes the wedge 10b upward. Therefore, even when the setscrew 10a is loosened after compulsorily opening the mechanical pressure-regulating valve 3, the wedge 10b is not returned upward and, as a result, the pin 10d is not returned laterally, either. Namely, in the mass flow controller 1 shown above, once the mechanical pressure-regulating valve 3 is compulsorily opened, the mechanical pressure-regulating valve 3 remains opened thereafter. However, it may be configured such that a mechanism which energizes the wedge 10b upward and the mechanical pressure-regulating valve 3 can be closed by loosening the setscrew 10a after compulsorily opening the mechanical pressure-regulating valve 3.

Furthermore, as mentioned above, it is preferable that the compulsive valve-opening mechanism 10 is disposed in the external region of the channel 8 of a fluid. In accordance with this, a seal structure for maintaining airtightness of the channel 8 of the fluid, etc. can be omitted to constitute the compulsive valve-opening mechanism as a simpler configuration, like the mass flow controller 1 shown here.

In addition, as mentioned above, it is preferable that the opening when the mechanical pressure-regulating valve 3 is compulsorily opened by the compulsive valve-opening mechanism 10 is larger than the maximum opening (cross section of a valve orifice) of the mechanical pressure-regulating valve 3 at the time of an operation to adjust the pressure P1 in the pressure-regulating chamber 3f to the set pressure PS (which may be hereinafter referred to as a "pressure-regulating operation") by the mechanical pressure-regulating valve 3 during the (normal) operation of the mass flow controller 1. In accordance with this, discharge efficiency when the mechanical pressure-regulating valve 3 is compulsorily opened to make the fluid discharge from the interior of the mass flow controller 1 can be enhanced to shorten a time period required for discharging, or ultimate vacuum in exhaustion by a vacuum pump can be raised.

Example 5

By the way, specific configurations of the compulsive valve-opening mechanism is not limited to the above-mentioned working example, the compulsive valve-opening mechanism may have any configuration as long as the fluid can be made to discharge from the blockade space, by compulsorily opening the mechanical pressure-regulating valve, before detaching the mass flow controller from a gas supply line of semiconductor production equipment, etc., for example.

However, in a use in which a plurality of types of process gases is used, such as a gas supply line of semiconductor production equipment, for example, a plurality of mass flow controllers is disposed in parallel on the base, in general. Furthermore, in the art, a size and shape of a mass flow controller has a unified standards is unified, for example, for the purpose of maintenance of the compatibility between mass flow controllers and/or minimization of an installation area (footprint), etc. For this reason, for example, in a state that a mass flow controller is built in a gas supply line of semiconductor production equipment, etc., a lateral surface and bottom face of each mass flow controller cannot be touched.

Therefore, structurally, although the mechanical pressure-regulating valve can be compulsorily opened by screwing the adjusting screw disposed on its bottom surface to raise elastic power of the pressure-regulating spring, it may be impossible to compulsorily open the mechanical pressure-regulating valve in accordance with such a technique, practically.

In view of the above, it is preferable that the compulsive valve-opening mechanism is accommodated in a limited space within the base and an operation part (for example, the setscrew 10a and the wedge accommodating hole 11a in the above-mentioned working example, etc.) of the compulsive valve-opening mechanism is constituted compactly such that the operation part can be prepared among the components mounted on the upper surface of the base, etc.

Figure 7:
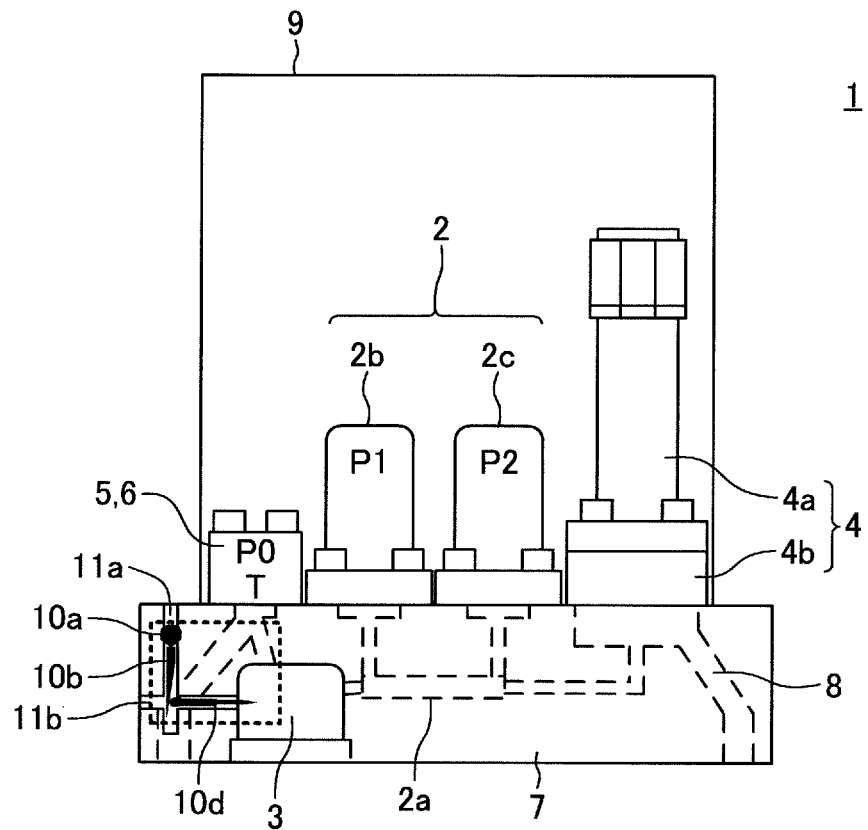
FIG. 7 is a side view for showing an example of an implementation of a mass flow controller according to further another working example of the present invention.
Figure 8:
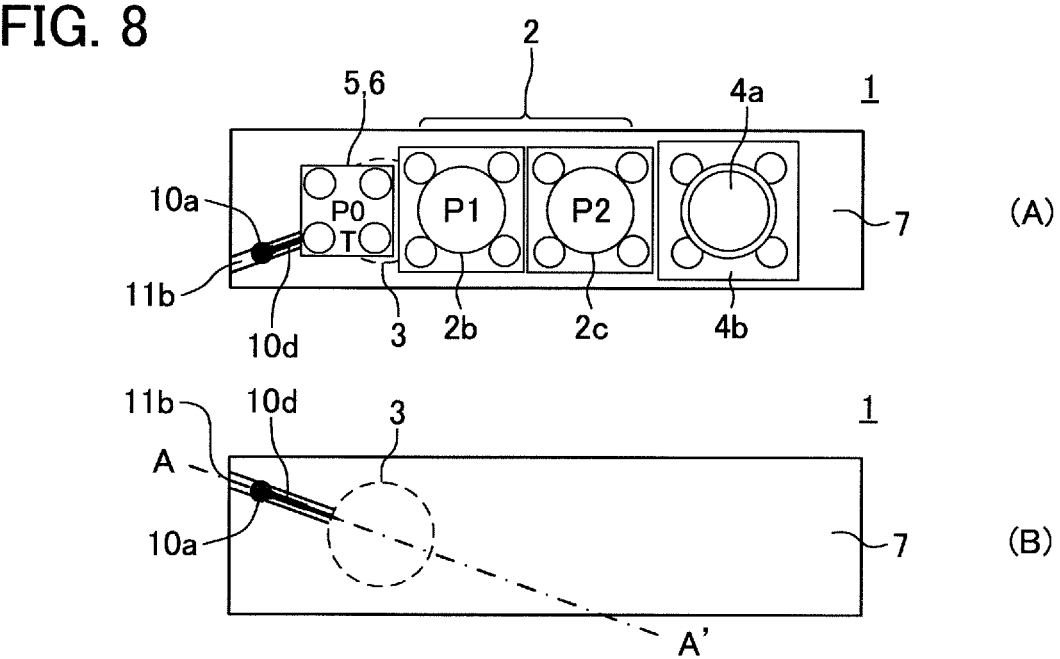
FIG. 8 is (A) plan view and (B) bottom view of the mass flow controller shown in FIG. 7.

Then, in this working example, a specific example of a mass flow controller comprising a compulsive valve-opening mechanism constituted compactly as mentioned above will be explained, referring to accompanying drawings. FIG. 7 is a side view for showing an example of an implementation of a mass flow controller according to another working example of the present invention. FIG. 8 is (A) plan view and (B) bottom view of the mass flow controller shown in FIG. 7. The casing 9 is omitted in FIG. 8. Moreover, in both FIG. 7 and FIG. 8, although the compulsive valve-opening mechanism 10 and the compulsive valve-opening-mechanism accommodating hole 11 are prepared in the interior of the base 7, they are illustrated for explanation.

As shown in FIG. 7, the wedge accommodating hole 11a is formed in a region in which the components are not mounted on the upper surface of the base 7, and the setscrew 10a and the wedge 10b are accommodated therein. Thereby, in a state that the mass flow controller 1 is built in, for example, within a gas supply line of semiconductor production equipment, etc., the setscrew 10a can be operated to make the compulsive valve-opening mechanism 10 act. In addition, a quadrangle illustrated with a dotted line in FIG. 7 corresponds to a region where the mechanical pressure-regulating valve 3 and the compulsive valve-opening mechanism 10 are disposed in FIG. 5 and FIG. 6.

Next, as shown in FIG. 8, the pin accommodating hole 11b is formed aslant toward the center of the mechanical pressure-regulating valve 3. Therefore, the setscrew 10a and the wedge accommodating hole 11a (not shown) are disposed in a position close to the corner instead of the central part of the base 7. This is a layout for preventing these members and accommodating hole which constitute the compulsive valve-opening mechanism 10 from interfering with the channel 8 formed in the interior of the base 7. In addition, a dashed-dotted line A-A' shown in FIG. 8 corresponds to the cross-sections of the mechanical pressure-regulating valve 3 and the compulsive valve-opening mechanism 10 shown in FIG. 5 and FIG. 6. Therefore, the fluid outlet 3k is not drawn in FIG. 5 and FIG. 6.

In accordance with the configuration as mentioned above, in the mass flow controller 1 according to this working example, in a state that the mass flow controller 1 is built in, for example, within a gas supply line of semiconductor production equipment, etc., by screwing the setscrew 10a into the wedge accommodating hole 11a formed in a region in which no components are mounted on the upper surface of the base 7, the compulsive valve-opening mechanism 10 can be made to act to compulsorily open the mechanical pressure-regulating valve 3.

Although some embodiments which have specific configurations have been explained for the purpose of explaining the present invention as mentioned above, it is needless to say that the scope of the present invention is not limited to these exemplary embodiments and modification can be suitably made within the limits of the matter described in the claim and the specification.

The invention claimed is:

1. A mass flow controller comprising:
a base;
a flow meter mounted on said base;
a mechanical pressure-regulating valve embedded in said base and disposed adjacent to and on an upstream side of said flow meter; and
a flow control valve mounted on said base and disposed on a downstream side of said flow meter
wherein;
said mechanical pressure-regulating valve comprises;
   a pressure-regulating chamber which constitutes a part of a channel of a fluid in said mass flow controller; and
   a diaphragm which separates an internal region of said pressure-regulating chamber from an external region of said channel; and
said mechanical pressure-regulating valve is configured to be opened by at least one part of said diaphragm being displaced to a side of said pressure-regulating chamber when pressure of said fluid in said pressure-regulating chamber is lower than a predetermined set pressure.

2. The mass flow controller of claim 1, wherein:
said flow meter is a pressure type flow meter.

3. The mass flow controller of claim 2, wherein:
said pressure type flow meter comprises a pressure sensor on the upstream side and a pressure sensor on the downstream side.

4. The mass flow controller of claim 2, wherein:
said pressure type flow meter comprises a differential pressure sensor configured to measure differential pressure between pressure on the upstream side and pressure on the downstream side.

5. The mass flow controller of claim 1, further comprising:
a pressure sensor on the upstream side of said mechanical pressure-regulating valve.

6. The mass flow controller of claim 5, wherein:
said flow meter is a pressure type flow meter.

7. The mass flow controller of claim 6, wherein:
said pressure type flow meter comprises a pressure sensor on the upstream side and a pressure sensor on the downstream side.

8. The mass flow controller of claim 6, wherein:
said pressure type flow meter comprises a differential pressure sensor configured to measure differential pressure between pressure on the upstream side and pressure on the downstream side.

9. The mass flow controller of claim 1, further comprising a valve-opening mechanism configured to open said mechanical pressure-regulating valve by an external operation.

10. A mass flow controller comprising:
a base;
a flow meter mounted on said base;
a flow control valve mounted on said base and disposed on a downstream side of said flow meter;
a mechanical pressure-regulating valve embedded in said base and disposed adjacent to and on an upstream side of said flow meter, said mechanical pressure-regulating valve comprises:
   a pressure-regulating chamber which constitutes a part of a channel of a fluid in said mass flow controller; and
   a diaphragm which separates an internal region of said pressure-regulating chamber from an external region of said channel;
said mechanical pressure-regulating valve is configured to be opened by at least one part of said diaphragm being displaced to a side of said pressure-regulating chamber when pressure of said fluid in said pressure-regulating chamber is lower than a predetermined set pressure; and
a valve-opening mechanism configured to open said mechanical pressure-regulating valve, said valve-opening mechanism comprises a member configured to displace at least said one part of said diaphragm to said side of said pressure-regulating chamber by an external operation.

11. The mass flow controller of claim 10, wherein:
an opening when said mechanical pressure-regulating valve is opened by said valve-opening mechanism is larger than a maximum opening of said mechanical pressure-regulating valve at the time of an operation of said mass flow controller.

12. The mass flow controller of claim 10, wherein:
said valve-opening mechanism is disposed in an outer region of said channel of said fluid.

13. The mass flow controller of claim 12, wherein:
an opening when said mechanical pressure-regulating valve is opened by said valve-opening mechanism is larger than a maximum opening of said mechanical pressure-regulating valve at the time of an operation of said mass flow controller.

14. The mass flow controller of claim 10, wherein:
said flow meter is a pressure type flow meter.

15. The mass flow controller of claim 14, wherein:
said pressure type flow meter comprises a pressure sensor on the upstream side and a pressure sensor on the downstream side.

16. The mass flow controller of claim 14, wherein:
said pressure type flow meter comprises a differential pressure sensor configured to measure differential pressure between pressure on the upstream side and pressure on the downstream side.

17. The mass flow controller of claim 10, further comprising:
a pressure sensor on the upstream side of said mechanical pressure-regulating valve.

18. The mass flow controller of claim 17, wherein:
said flow meter is a pressure type flow meter.

19. The mass flow controller of claim 18, wherein:
said pressure type flow meter comprises a pressure sensor on the upstream side and a pressure sensor on the downstream side.

20. The mass flow controller of claim 18, wherein:
said pressure type flow meter comprises a differential pressure sensor configured to measure differential pressure between pressure on the upstream side and pressure on the downstream side.

21. The mass flow controller of claim 10, further comprising a valve-opening mechanism configured to open said mechanical pressure-regulating valve by an external operation.

* * * * *